(12) United States Patent
Mori (10) Patent No.: US 7,220,032 B2
(45) Date of Patent: May 22, 2007

(54) VEHICLE SPOILER WITH STOP LAMP

(75) Inventor: Tatsuro Mori, Novi, MI (US)

(73) Assignee: Nissan Technical Center North America, Inc., MI (US)

(*) Notice: Subject to any disclaimer, the term of this patent is extended or adjusted under 35 U.S.C. 154(b) by 96 days.

(21) Appl. No.: 11/077,119

(22) Filed: Mar. 11, 2005

(65) Prior Publication Data

US 2006/0203504 A1 Sep. 14, 2006

(51) Int. Cl.
*B60Q 1/44* (2006.01)

(52) U.S. Cl. ............... 362/541; 362/496; 362/548; 362/549; 296/180.1

(58) Field of Classification Search ............... 362/541, 362/546, 549, 548, 496, 503; 296/180.1; 411/389, 403, 537, 538
See application file for complete search history.

(56) References Cited

U.S. PATENT DOCUMENTS

| | | | |
|---|---|---|---|
| 4,186,645 A * | 2/1980 | Zaydel ............... 411/55 |
| 4,534,496 A * | 8/1985 | Bott ............... 224/326 |
| 4,558,898 A * | 12/1985 | Deaver ............... 296/180.1 |
| 4,652,036 A | 3/1987 | Okamoto et al. |
| 4,736,279 A | 4/1988 | Yamai et al. |
| 4,819,132 A * | 4/1989 | Hwan et al. ............... 362/541 |
| 4,845,600 A | 7/1989 | Matsumura et al. |
| 5,062,027 A * | 10/1991 | Machida et al. ............... 362/541 |
| 5,119,068 A * | 6/1992 | Nagai et al. ............... 340/479 |
| D423,430 S * | 4/2000 | Minh ............... D12/181 |
| D423,431 S * | 4/2000 | Minh ............... D12/181 |
| 6,663,272 B1 * | 12/2003 | Liu ............... 362/541 |
| 6,899,450 B2 * | 5/2005 | A-Gi ............... 362/496 |
| 6,927,736 B1 * | 8/2005 | Kornbau et al. ............... 343/712 |

* cited by examiner

*Primary Examiner*—Alan Cariaso
*Assistant Examiner*—Leah S Lovell
(74) *Attorney, Agent, or Firm*—Global IP Counselors (57) ABSTRACT

A vehicle spoiler is provided that has a stop lamp removably disposed in the lamp receiving aperture of the vehicle spoiler. The vehicle spoiler is coupled to a vehicle body panel (e.g., the trunk) such that the stop lamp can be easily removed without detaching the vehicle spoiler from the vehicle body panel. Preferably, the stop lamp is attached to the vehicle spoiler by a stop lamp mounting fastener that is also used to attach the vehicle to the vehicle body panel.

26 Claims, 12 Drawing Sheets

VEHICLE SPOILER WITH STOP LAMP

BACKGROUND OF THE INVENTION

1. Field of the Invention

The present invention generally relates to a vehicle spoiler with a stop lamp. More specifically, the present invention relates to a vehicle spoiler having an easily removable and easily re-installable stop lamp.

2. Background Information

Many vehicles are being provided with rear spoilers to enhance both appearance and performance of the vehicle. Depending on the vehicle, a stop lamp is sometimes provided in the spoiler. The stop lamp is typically integrated into the spoiler such that the wires are concealed. One problem with such spoilers with an integrated stop lamp is that removal and re-installation of the stop lamp is sometimes difficult and/or time consuming. Specifically, stop lamp bulbs routinely need to be replaced. Typically, fasteners retaining the stop lamp in the spoiler are difficult to access for stop lamp removal and difficult to re-install after bulb replacement. In some spoilers, the entire spoiler needs to be removed in order to replace the stop lamp bulb. Two examples of conventional vehicle spoilers with integrated stop lamps are disclosed in U.S. Pat. No. 4,736,279 (Toyota Motor Corp. and Stanley Electric Co., Ltd.) and U.S. Pat. No. 4,845,600 (Koito Manufacturing Co., Ltd.). One example of a conventional mounting arrangement for a vehicle spoiler is disclosed in U.S. Pat. No. 4,652,036 (Toyoda Gosei Co., Ltd.).

In view of the above, it will be apparent to those skilled in the art from this disclosure that there exists a need for an improved vehicle spoiler with stop lamp that makes bulb replacement easier. This invention addresses this need in the art as well as other needs, which will become apparent to those skilled in the art from this disclosure.

SUMMARY OF THE INVENTION

It has been discovered that removal and re-installation of a stop lamp in a spoiler assembly is easier and simpler if a fastener is retained in an easily accessible location within the spoiler assembly.

One object of the invention is to provide a spoiler assembly with a stop lamp that allows for simple removal and reinstallation of the stop lamp.

Accordingly, in one embodiment of the invention, a vehicle body structure includes a vehicle spoiler, a stop lamp and a stop lamp mounting fastener. The vehicle spoiler includes an upwardly facing spoiler surface. The vehicle spoiler also includes a vehicle body facing spoiler surface and a rear facing spoiler surface. The rear facing spoiler surface has a lamp receiving aperture. The stop lamp is removably disposed in the lamp receiving aperture with a mounting portion of the stop lamp disposed between the upwardly facing spoiler surface and the vehicle body facing spoiler surface. The stop lamp mounting fastener is accessible through the access opening in the vehicle body panel. The stop lamp mounting fastener includes a lamp securing portion and a body securing portion. The lamp securing portion is configured and arranged to selectively engage the mounting portion of the stop lamp housing to removably secure the stop lamp housing to the vehicle spoiler. The vehicle body securing portion is configured and arranged to selectively engage a vehicle body panel to removably secure the vehicle spoiler to the vehicle body panel.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
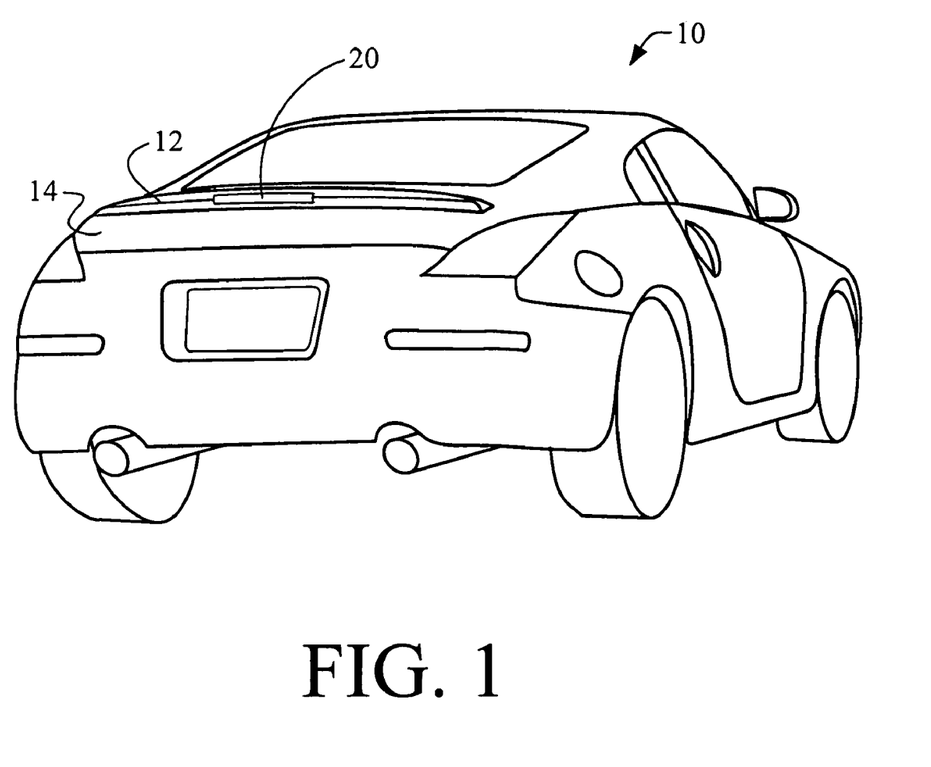
FIG. 1 is a rear perspective view of a vehicle with a spoiler in accordance with one embodiment of the present invention.

Referring initially to FIG. 1, a vehicle 10 is illustrated that is equipped with a vehicle spoiler assembly 12 in accordance with a first embodiment of the present invention. The vehicle 10 includes numerous conventional design features, structural elements, suspension and power train components whose description has been omitted for brevity. It should be understood that mainly those elements of the vehicle 10 that assist in understanding the various features of the present invention are described below.

The vehicle 10 has an outer body panel 14 that is configured and arranged to receive and support the spoiler assembly 12. In a preferred embodiment of the present invention, the outer body panel 14 is a trunk lid of the vehicle 10, as shown in FIG. 1. Alternatively, the outer body panel 14 can be a rear fender portion or any other portion of the vehicle 10 that is suitable for the spoiler assembly 12 of the present invention.

Figure 2:
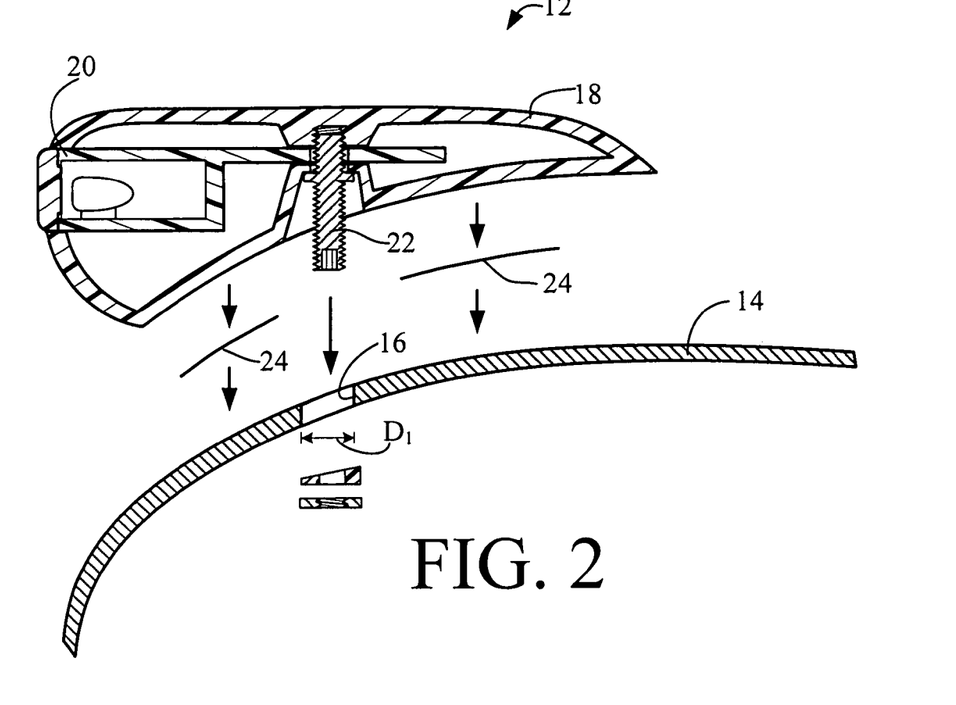
FIG. 2 is an exploded cross sectional view of the spoiler being installed onto an outer body panel of the vehicle in accordance with the present invention.
Figure 5:
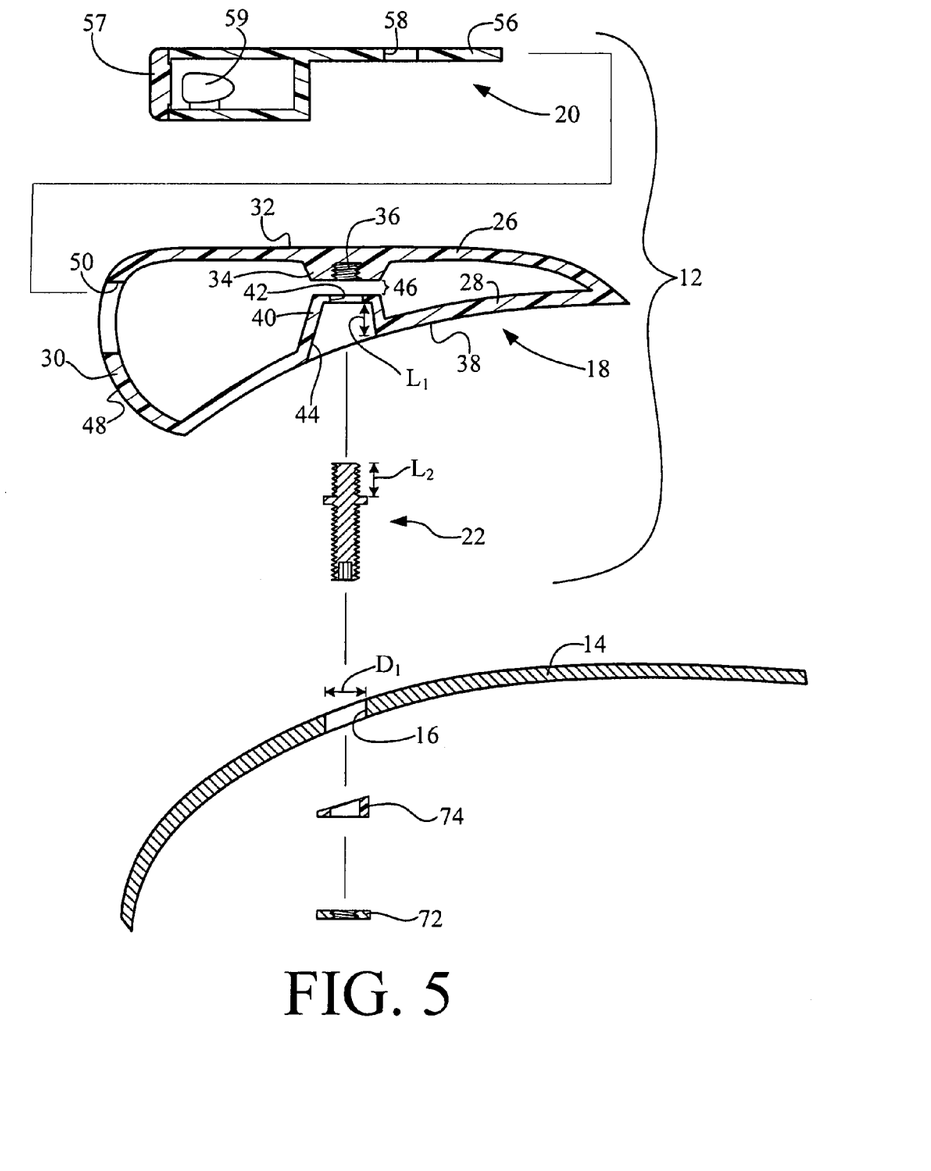
FIG. 5 is an exploded cross sectional side view of the spoiler, the stop lamp assembly, the stop lamp mounting fastener and the outer body panel in accordance with the present invention.

As shown in FIG. 2, the outer body panel 14 has an access opening 16 that is preferably accessible from within an interior portion of the vehicle 10. The access opening 16 has a diameter $D_1$, as shown in FIGS. 2 and 5. In the depicted embodiment, the outer body panel 14 has a curved or arc shaped contour, as shown in cross-section in FIGS. 2 and 3. It should be understood from the drawings and the description herein, that the outer body panel 14 can also have other contours such as a flat surface contour.

Figure 3:
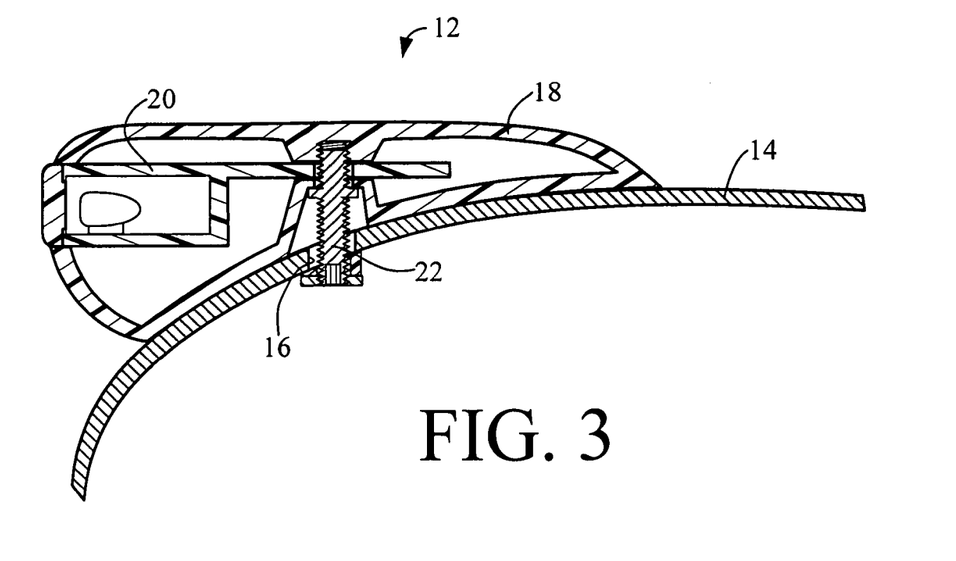
FIG. 3 is another cross sectional view of the spoiler installed on the outer body panel of the vehicle in accordance with the present invention.
Figure 4:
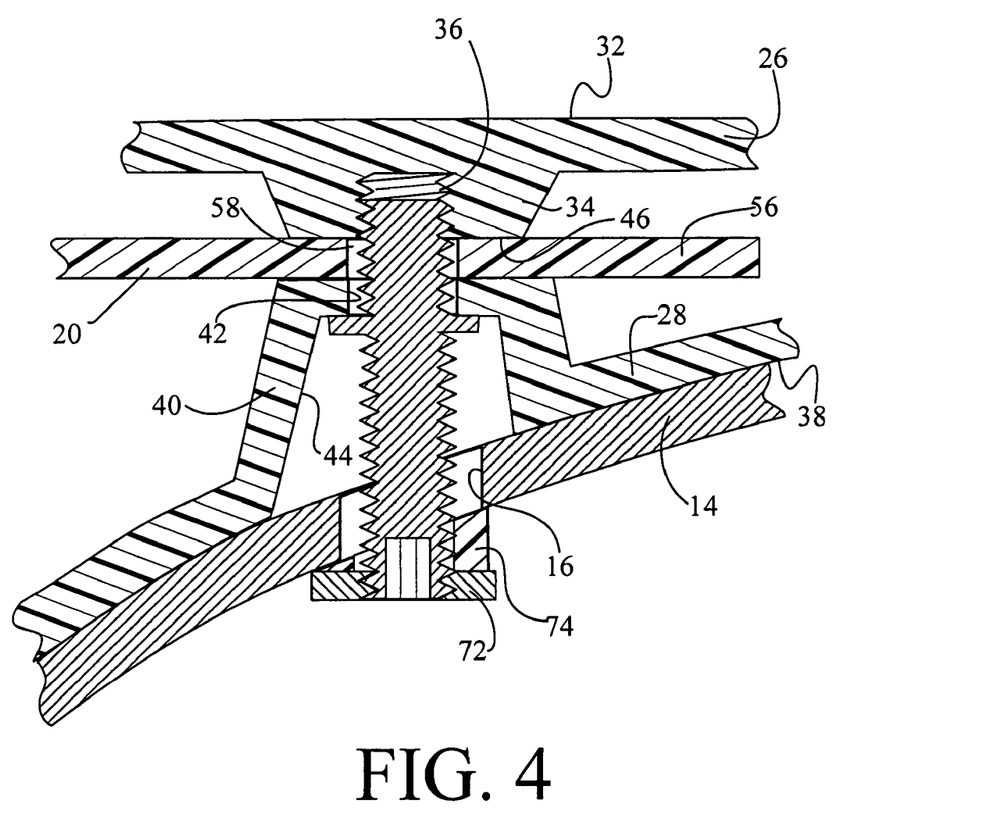
FIG. 4 is an enlarged cross sectional view of a portion of the spoiler and the outer body panel depicted in FIG. 3 in accordance with the present invention.

The spoiler assembly 12 of the present invention is installed on the outer body panel 14, as shown FIGS. 2, 3 and 4. The spoiler assembly 12 basically includes a vehicle spoiler 18, a stop lamp housing 20 and a stop lamp mounting fastener 22. The spoiler assembly 12 is installed as a unit on the outer body panel 14 using, for example, a double sided adhesive tape 24 (FIG. 2) and/or other fasteners as needed and/or desired. The spoiler assembly 12 is preferably installed such that a portion of the stop lamp mounting fastener 22 extends through the access opening 16 in the outer body panel 14, as shown in FIGS. 3 and 4. Thus, the stop lamp mounting fastener 22 can acts as a mounting fastener to fix the vehicle spoiler 18 to the outer body panel 14.

The various portions of spoiler assembly 12 are now described in more detail with specific reference to FIGS. 4 and 5. The vehicle spoiler 18 basically includes an upper wall 26, a lower wall 28 and a rear wall 30 (FIG. 5). The upper wall 26 includes an upwardly facing spoiler surface 32 and a lamp mounting portion 34. The lamp mounting portion 34 is formed with a threaded bore 36 that receives one end of the stop lamp mounting fastener 22.

The lower wall 28 basically includes a vehicle body facing surface 38 and a fastener receiving portion 40. It should be understood from the drawings that portions of the vehicle body facing surface 38 contact the body panel 14. Further, the vehicle body facing surface 38 surrounds the fastener receiving portion 40. The fastener receiving portion 40 of the lower wall 28 has a truncated conical shape with a fastener opening 42. The fastener receiving portion 40 of the lower wall 28 defines a fastener receiving recess 44 that receives the stop lamp mounting fastener 22, as is described further below. The fastener receiving recess 44 has a minimum length $L_1$ (see FIG. 5). As shown in FIGS. 4 and 5, the fastener opening 42 extend through the lower wall 28 and is axially aligned with the threaded bore 36 of the lamp mounting portion 34. The lamp mounting portion 34 of the upper wall 26 and the fastener receiving portion 40 are spaced apart from one another defining a lamp receiving mounting slot 46, shown in FIG. 5. The stop lamp mounting fastener 22 extends through the fastener opening 42 of the lower wall 28 and is threaded into the threaded bore 36 to secure the stop lamp housing 20 to the vehicle spoiler 18, as described further below.

The rear wall 30 includes a rearward facing surface 48 and a stop lamp receiving aperture 50. The stop lamp receiving aperture 50 is dimensioned to receive the stop lamp housing 20. The stop lamp housing 20 is removably installable in the stop lamp receiving aperture 50 of the vehicle spoiler 18 via the stop lamp mounting fastener 22.

The stop lamp housing 20 basically includes a mounting portion 56 and a lamp lens 57. The mounting portion 56 is formed with a retaining aperture 58 that is dimensioned to receive a portion of the stop lamp mounting fastener 22. The mounting portion 56 has a height that is slightly less than the width of the lamp receiving mounting slot 46. Therefore, mounting portion 56 of the stop lamp housing 20 is easily inserted into the lamp receiving mounting slot 46. The lamp lens 57 covers a lamp bulb 59 that illuminates the rear of the vehicle 10 when, for instance, the brake pedals has been depressed. It should be understood that the lamp bulb 59 is connected to electric wires (not shown) that selectively provide power to light the lamp bulb 59.

As shown in FIGS. 2, 3 and 5, the stop lamp 22 is removably disposed in the stop lamp receiving aperture 50 in the vehicle spoiler 18. When installed in the spoiler 18, the mounting portion 56 of the stop lamp 22 extends into the lamp receiving mounting slot 46 between the lamp mounting portion 34 of the upper wall 26 and the fastener receiving portion 40 of the lower wall 28. Furthermore, when installed in the spoiler 18, the retaining aperture 58 in the mounting portion 56 of the stop lamp housing 20 is aligned with the threaded bore 36, the fastener opening 42 and the fastener receiving recess 44.

The stop lamp mounting fastener 22 is configured and arranged for installation in the retaining aperture 58 of the mounting portion 56 of the stop lamp housing 20. The stop lamp mounting fastener 22 is further configured and arranged for installation in the fastener opening 42 and the fastener receiving recess 44 of the spoiler 18, and further into the threaded bore 36, as shown in FIGS. 4 and 5.

Figure 6:
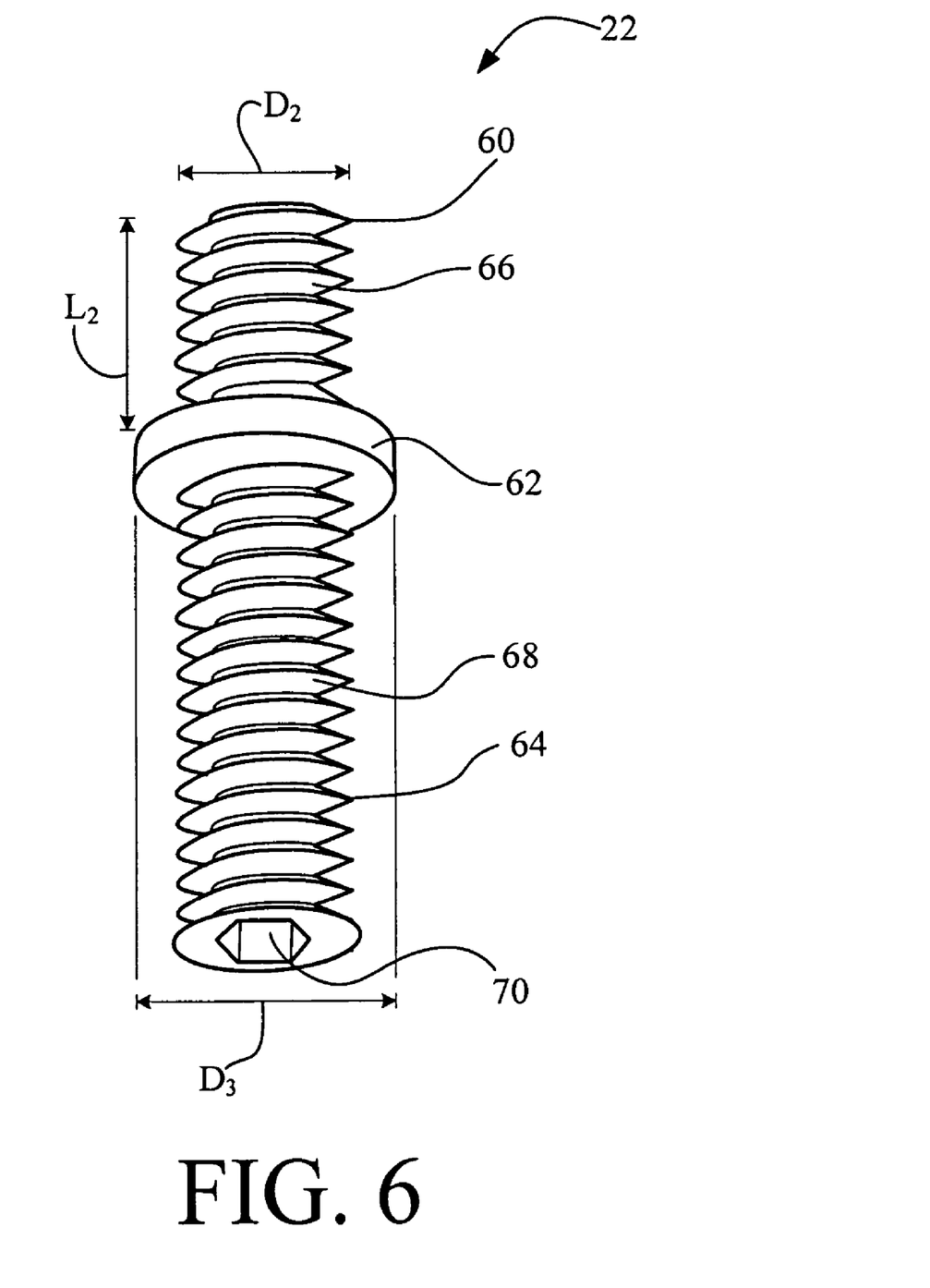
FIG. 6 is a perspective view of the stop lamp mounting fastener removed from the spoiler in accordance with the present invention.

As shown in FIG. 6, the stop lamp mounting fastener 22 basically includes a lamp securing portion 60, a stop portion 62 and a vehicle body securing portion 64. The lamp securing portion 60, the stop portion 62 and the vehicle body securing portion 64 are preferably formed as a single unitary member, but can alternatively be formed as separate elements welded or otherwise fixed to one another. For instance, the lamp securing portion 60 and the vehicle body securing portion 64 can be formed as a single threaded shaft and the stop portion 62 welded or otherwise fixed thereto.

The lamp securing portion 60 is configured and arranged to extend through the retaining aperture 58 of the mounting portion 56 of the stop lamp housing 20 to removably secure the stop lamp housing 20 to the vehicle spoiler 12 as shown in FIG. 4. As shown in FIG. 6, the lamp securing portion 60 includes a first set of threads 66 having a diameter $D_2$ and an axial length $L_2$. Preferably, the length $L_2$ of the threads 66 is approximately equal to or slightly longer than the minimum length $L_1$ of the fastener receiving recess 44. The threads 66 of the lamp securing portion 60 are dimensioned to engage and be retained in the threaded bore 36 of the upper wall 26 of the spoiler 18.

The stop portion 62 is an annular disk shaped protrusion that extends outwardly from the stop lamp mounting fastener 22. The stop portion 62 has an outer diameter $D_3$ that is larger than the diameter $D_2$ of the threads 66 of the lamp securing portion 60. The outer diameter $D_3$ of the stop portion 62 is also larger than the diameter $D_1$ of the access opening 16 in the outer body panel 14. The outer diameter $D_3$ of stop portion 62 is also larger than the fastener opening 42 in the vehicle spoiler 18.

Figure 10:
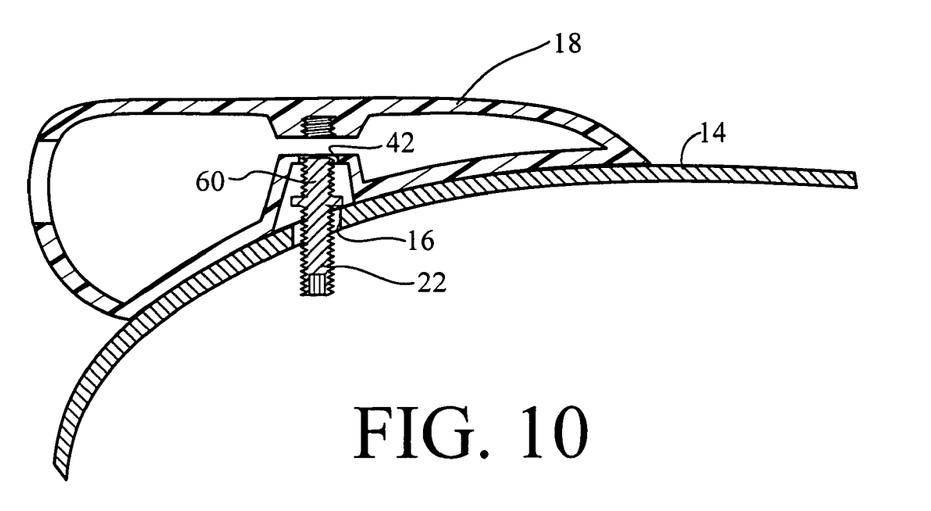
FIG. 10 is a cross sectional view of the spoiler with the stop lamp completely removed in accordance with the present invention.

The stop portion 62 is disposed between the lamp securing portion 60 and the vehicle body securing portion 64 to limit movement of the stop lamp mounting fastener 22 relative to the vehicle spoiler 18 and the outer body panel 14. Specifically, when the stop lamp mounting fastener 22 is in a stop lamp securing position (FIG. 7), the stop portion 62 retains the stop lamp mounting fastener 22 within the fastener receiving recess 44. Further, when the stop lamp mounting fastener 22 is moved from a stop lamp securing position (FIG. 7) to a stop lamp releasing position (FIG. 8), the stop lamp mounting fastener 22 is at least partially retained above the outer body panel 14 because outer diameter $D_3$ of the stop portion 62 is larger than the diameter $D_1$ of the access opening 16 in the outer body panel 14 (FIGS. 8 and 10).

The vehicle body securing portion 64 of the stop lamp mounting fastener 22 is configured and arranged to selectively engage the body panel 14 to removably secure the vehicle spoiler 18 to the body panel 14. The vehicle body securing portion 64 basically includes a second set of threads 68 and a free end that includes a tool engaging recess 70. The threads 68 have an outer diameter that is preferably the same as the outer diameter $D_2$ of the first set of threads 66 on the lamp securing portion 60. The tool engaging recess 70 is preferably a hex shaped opening, but can alternatively be a screwdriver receiving slot. As shown in FIGS. 3 and 4, with the spoiler 18 installed on the vehicle 10, a portion of the vehicle body securing portion 64 extends through the access opening 16 in the body panel 14. As well, the tool engaging recess 70 is accessible through the access opening 16 in the body panel 14.

As shown in FIG. 4, with the spoiler assembly 12 installed on the vehicle 10, a nut 72 and washer 74 are selectively threaded onto the threads 68 of the vehicle body securing portion 64. The nut 72 and washer 74 and the stop lamp mounting fastener 22 help to secure the spoiler 18 to the body panel 14 of the vehicle 10. The nut 72 includes threads that engage the threads 68 of the vehicle body securing portion 64 of the stop lamp mounting fastener 22. The nut 72 is preferably made of a metallic material, but can alternatively be made of a plastic or polymer material. The washer 74 can be made of any of a variety of materials. However, in the depicted embodiment, the washer 74 is shown made of an elastic, rubber or plastic material.

Figure 7:
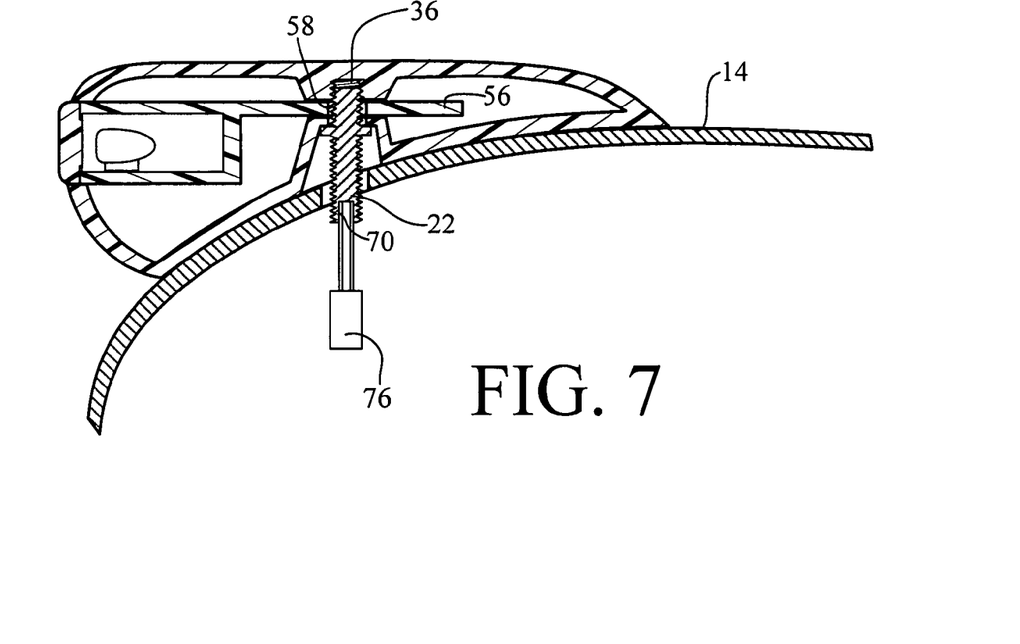
FIG. 7 is a cross sectional view of the spoiler and the stop lamp assembly with a tool being used to loosen the stop lamp mounting fastener in accordance with the present invention.
Figure 8:
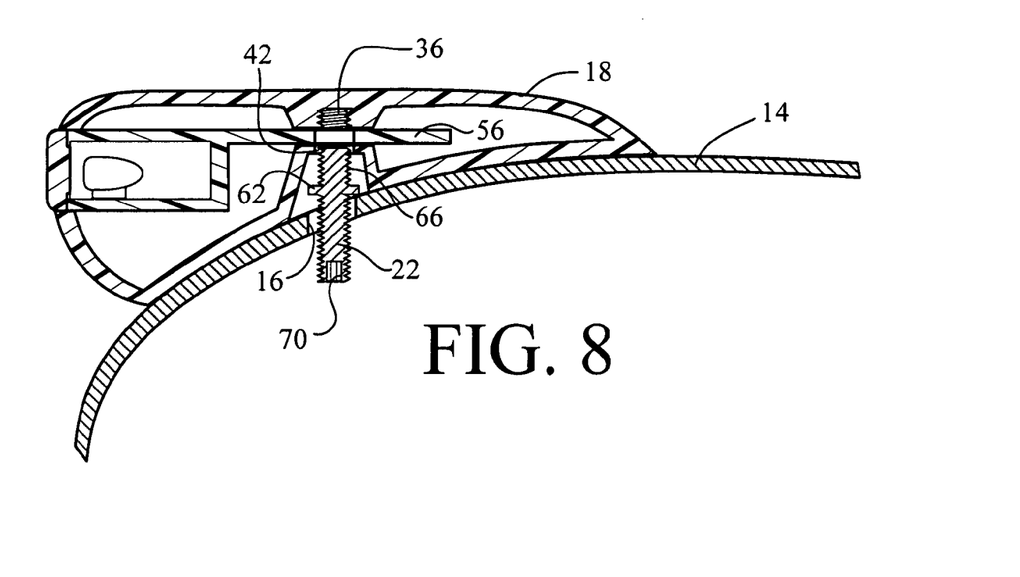
FIG. 8 is a cross sectional view of the spoiler with the stop lamp mounting fastener loosened so that the stop lamp can be removed in accordance with the present invention.

As shown in FIGS. 7, 8, 9, 10, 11 and 12, the stop lamp housing 20 can be easily removed from the spoiler assembly 12. As shown in FIGS. 7 and 8, stop lamp mounting fastener 22 is configured and arranged to selectively engage the mounting portion 56 of the stop lamp housing 20 when in the stop lamp securing position (FIG. 7) and to selectively disengage the mounting portion 56 of the stop lamp housing 20 when in the stop lamp releasing position (FIG. 8).

The first step in the removal of the stop lamp housing 20 is the loosening and removal of the nut 72 and washer 74. Once the nut 72 and 74 have been removed, a tool 76 is installed in the tool engaging recess 70, as shown in FIG. 7. The tool 76 is preferably a hex wrench. The tool 76 and stop lamp mounting fastener 22 are rotated to withdraw the stop lamp mounting fastener 22 from the threaded bore 36, and the retaining aperture 58.

As shown in FIG. 8, with the threads 66 of the lamp securing portion 60 freed from the threaded bore 36, the stop lamp mounting fastener 22 drops down. As also shown in FIG. 8, the vehicle body securing portion 64 extends partially through the access opening 16 in the body panel 14 and the stop portion 62 contacts the outer body panel 14. The fastener opening 42 of the lower wall 28 is spaced from the access opening 16 of the body panel 14 by a minimum distance that is generally equal to the length $L_1$ of the fastener receiving recess 44 (see FIG. 5). Since the axial length $L_2$ of the threads 66 is approximately equal to the length $L_1$ of the fastener receiving recess 44 (see FIG. 5), the stop lamp mounting fastener 22 can remain disposed in the fastener opening 42 of the lower wall 14 with the stop lamp mounting fastener 22 in the stop lamp releasing position (FIG. 8). As well, the stop portion 62 and the vehicle body securing portion 64 of the stop lamp mounting fastener 22 remain above the access opening of the body panel 14 when the stop lamp mounting fastener 22 is in the stop lamp releasing position. Accordingly, the various parts (the vehicle body panel 14 and the vehicle spoiler 18) are configured and arranged relative to the stop lamp mounting fastener 22 to maintain a securing orientation (vertical orientation) of the stop lamp mounting fastener 22 when in the stop lamp securing and releasing positions with the stop lamp housing 20 removed and the vehicle spoiler 18 mounted to the vehicle body panel 10.

Figure 9:
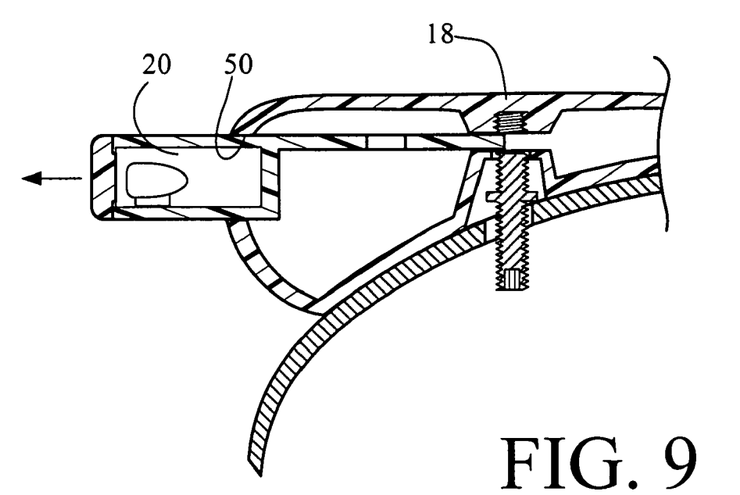
FIG. 9 is a cross sectional view of the spoiler with the stop lamp partially removed in accordance with the present invention.

As shown in FIG. 9, the stop lamp housing 20 is easily removed from the spoiler 18 through the stop lamp receiving aperture 50. Once removed from the spoiler 18, the lamp bulb 59 in the stop lamp housing 20 can easily be replaced as needed and/or desired.

Figure 11:
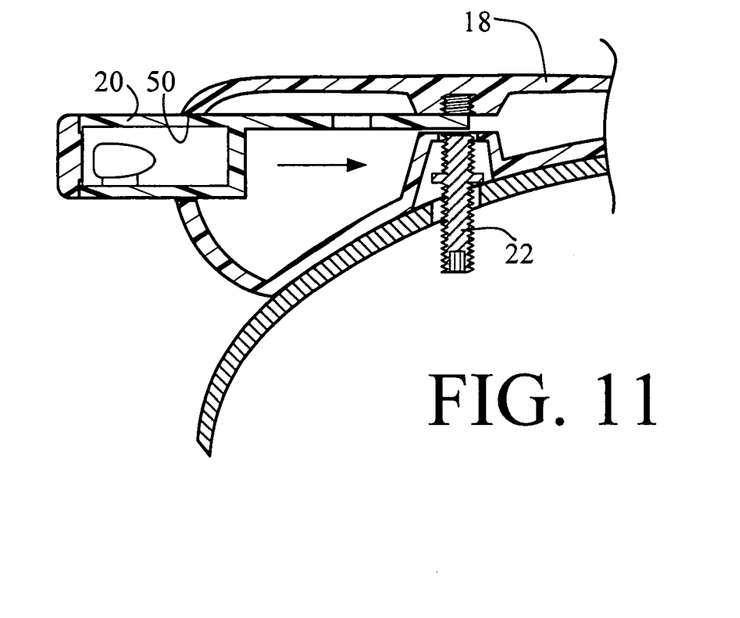
FIG. 11 is a cross sectional view of the spoiler with the stop lamp being reinstalled in accordance with the present invention.
Figure 12:
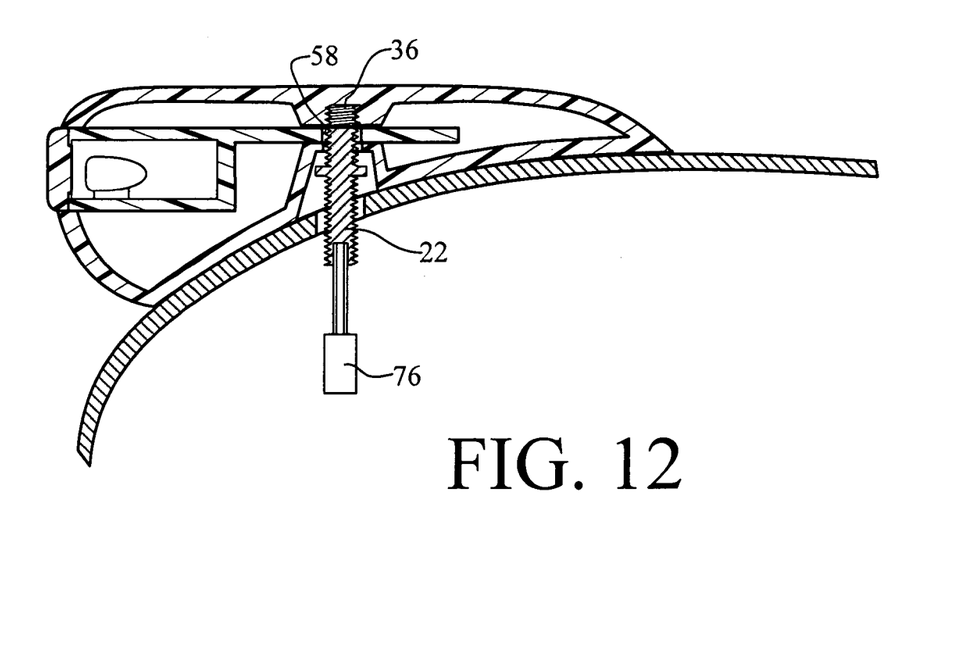
FIG. 12 is a cross sectional view of the spoiler with the stop lamp in the installed position and the stop lamp mounting fastener being reinstalled using the tool in accordance with the present invention.

As shown in FIG. 10, even with the stop lamp housing 20 removed, the stop lamp mounting fastener 22 remains in an easily re-installable position within the access opening 16 of the body panel 14. As well, the upper end of the lamp securing portion 60 of the stop lamp mounting fastener 22 remains in contact with the fastener opening 42 of the lower wall 28. As shown in FIG. 11, the stop lamp housing 20 is easily re-inserted into the stop lamp receiving aperture 50 of the spoiler 18. As shown in FIG. 12, the tool 76 can then be used to re-install the stop lamp mounting fastener 22 into the retaining aperture 58 of the stop lamp housing 20 and the threaded bore 36 of the spoiler 18.

Second Embodiment

Figure 13:
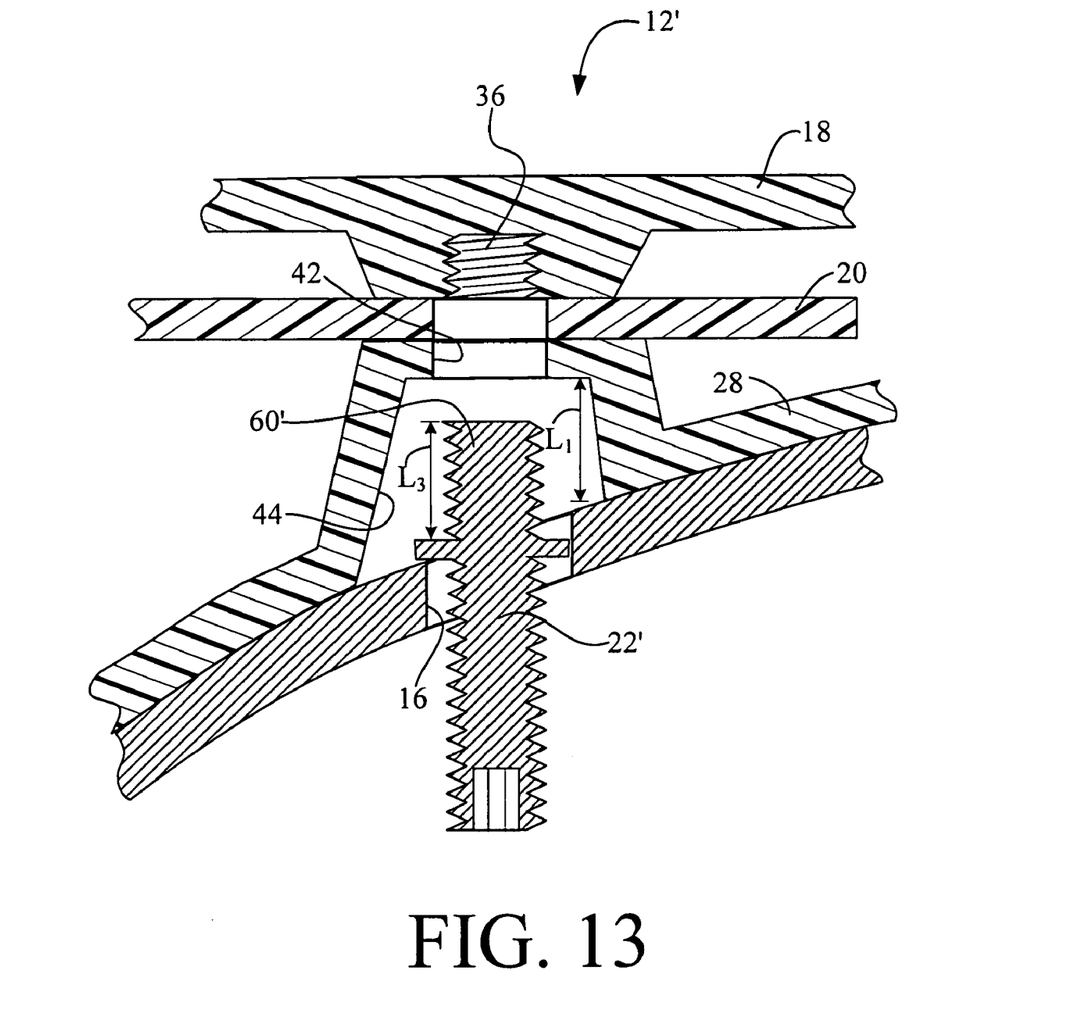
FIG. 13 is an enlarged cross sectional view, similar to FIG. 4, of the spoiler in accordance with a second embodiment of the present invention.

Referring now to FIG. 13, a spoiler assembly 12' having a stop lamp mounting fastener 22' will now be explained in accordance with a second embodiment. Basically, the only difference between the first and second embodiments is the stop lamp mounting fastener 22'. In fact, the vehicle spoiler 18 and the stop lamp housing 20 are identical in the first and second embodiments. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

As shown in FIG. 13, the stop lamp mounting fastener 22' includes a lamp securing portion 60' that has an axial length $L_3$. Preferably, the length $L_3$ of the lamp securing portion 60' is slightly less than the length $L_1$ of the fastener receiving recess 44. Therefore, the upper end of the lamp securing portion 60' is out of contact with the fastener opening 42 in the lower wall 18 of the spoiler 12'. Consequently, only the outer body panel 14 retains the stop lamp mounting fastener 22' in an easily re-installable position.

Third Embodiment

Figure 14:
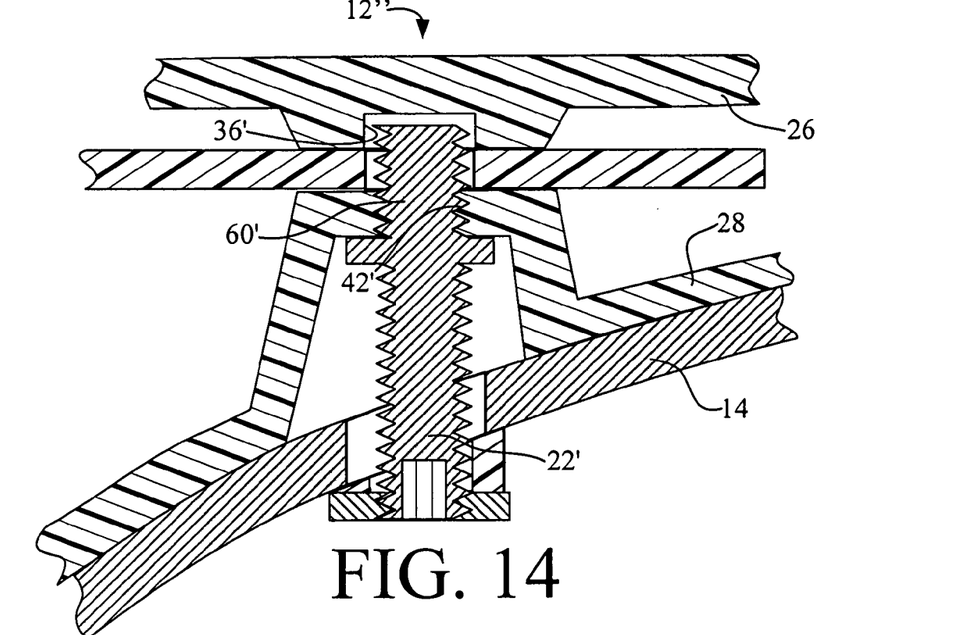
FIG. 14 is a cross sectional side view of the spoiler with the stop lamp mounting fastener fully installed in accordance with a third embodiment of the present invention.
Figure 15:
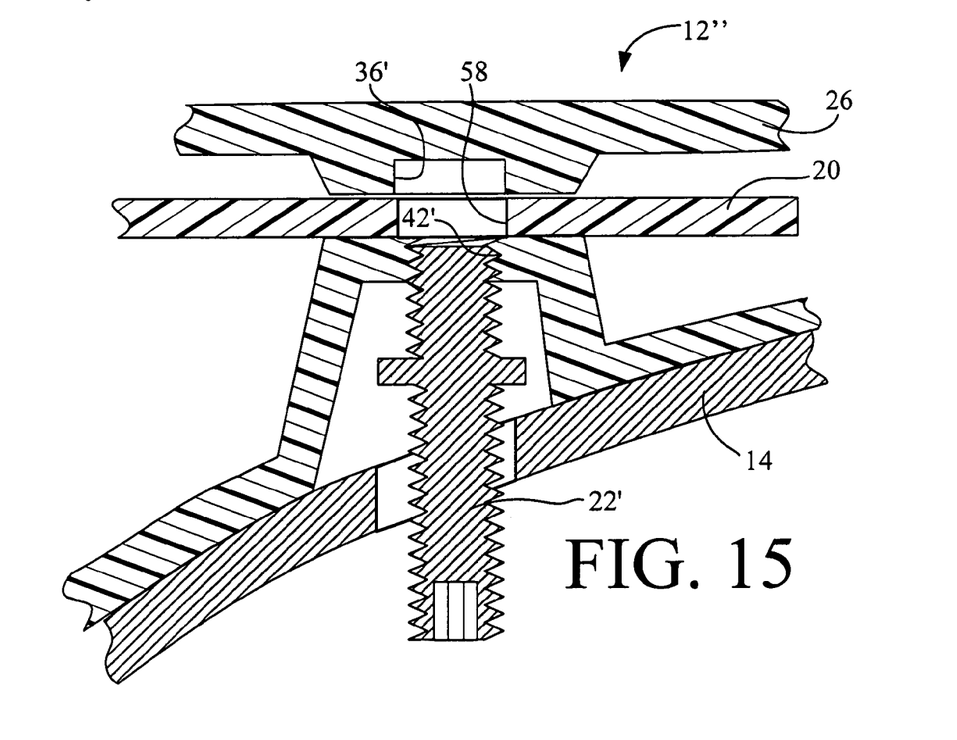
FIG. 15 is a cross sectional view of the spoiler with the stop lamp mounting fastener in the stop lamp removal position in accordance third embodiment of the present invention.
Figure 16:
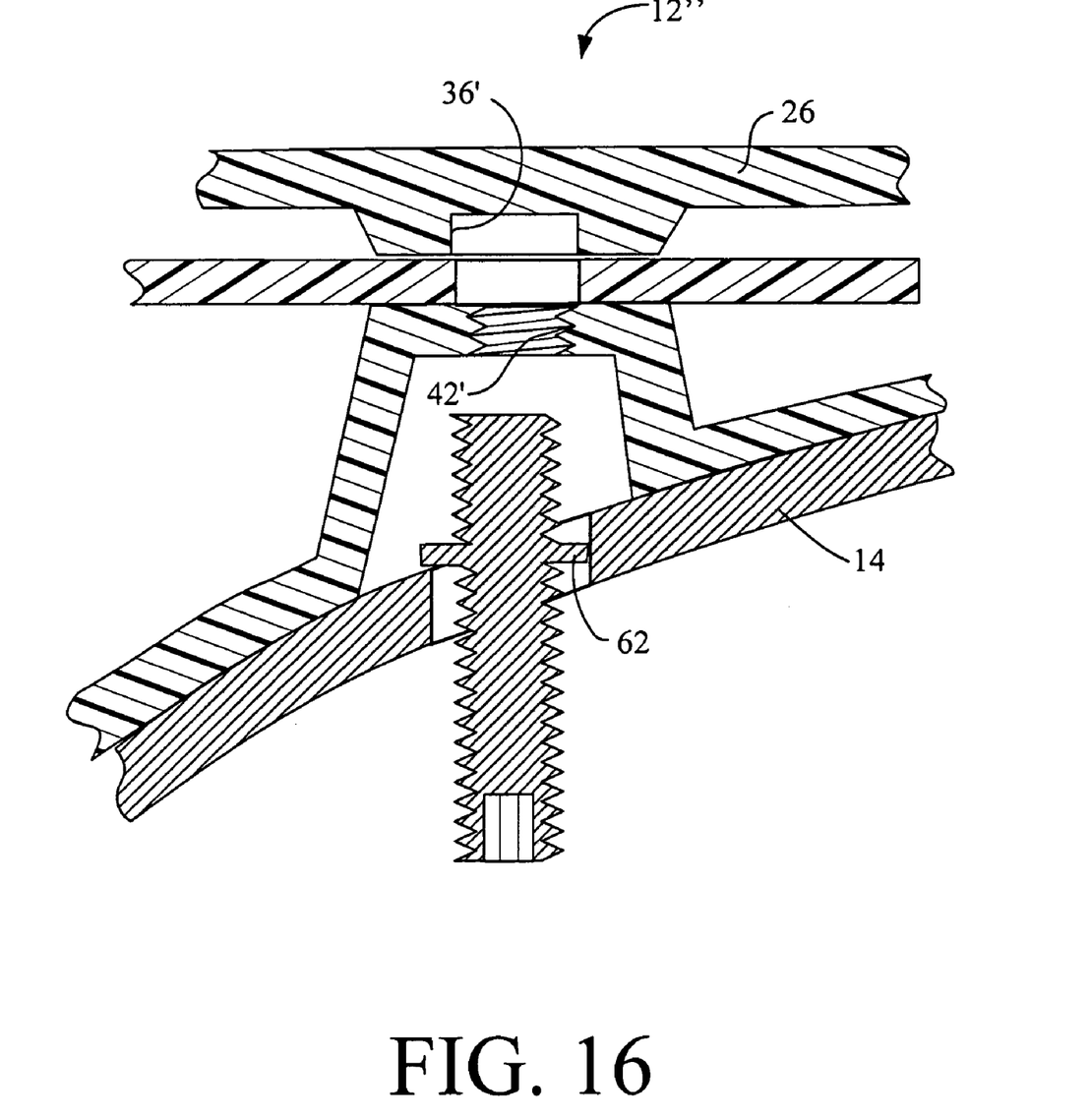
FIG. 16 is a cross sectional view showing the spoiler in accordance with the third embodiment of the present invention.

Referring now to FIGS. 14, 15 and 16, a spoiler assembly 12" will now be explained in accordance with a third embodiment. The only differences between the first and third embodiments are the use of the stop lamp mounting fastener 22' of the second embodiment and the manner in which the stop lamp mounting fastener 22' is coupled to the spoiler. Thus, unless otherwise specified or shown, the first and third embodiments are identical in construction. In view of the similarity between the first, second and third embodiments, the parts of the third embodiment that are identical to the parts of the earlier embodiments will be given the same reference numerals as the parts of the earlier embodiments. Moreover, the descriptions of the parts of the third embodiment that are identical to the parts of the earlier embodiments may be omitted for the sake of brevity. The parts of the third embodiment that differ from the parts of the earlier embodiments will be indicated with a single prime (') or a double prime (").

As shown in FIG. 14, the lower wall 28 is formed with a threaded fastener opening 42'. Further, the upper wall 26 is formed with an unthreaded aperture 36'. Therefore, a stop lamp mounting fastener 22' having a lamp securing portion 60' engages the threaded fastener opening 42' for retention of the stop lamp housing 20 within the spoiler assembly 12". As shown in FIG. 15, the stop lamp mounting fastener 22' is only partially lowered in order to free the stop lamp mounting fastener 22' from the retaining aperture 58 of the stop lamp housing 20. However, as shown in FIG. 16, it is possible to further rotate the stop lamp mounting fastener 22' so that the stop lamp mounting fastener 22' is completely out of the threaded fastener opening 42'. As a result, the stop portion 62 of the stop lamp mounting fastener 22' contacts the outer body panel 14. Consequently, either the lower wall 28 of the vehicle spoiler assembly 12" or the outer body panel 14 retains the stop lamp mounting fastener 22' in an easily re-installable position.

Fourth Embodiment

Figure 17:
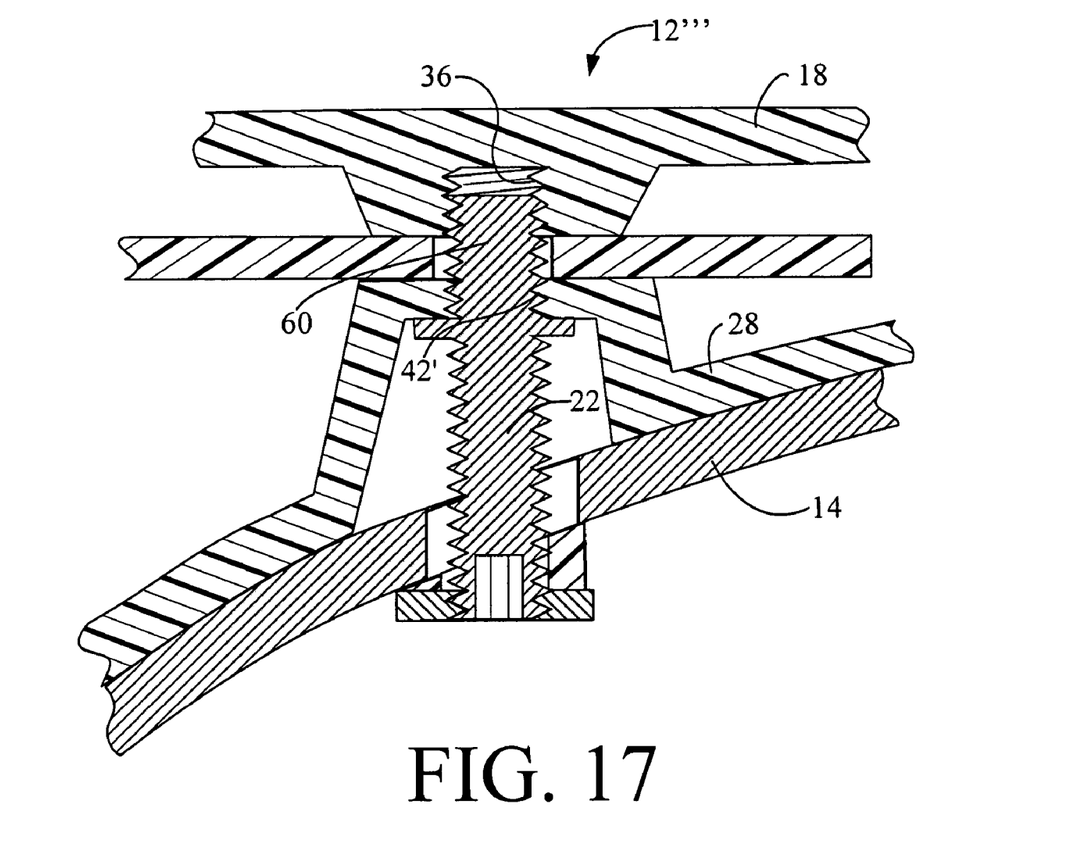
FIG. 17 is a cross sectional view of the spoiler in accordance with a fourth embodiment of the present invention.

Referring now to FIG. 17, a spoiler assembly 12'" will now be explained in accordance with a fourth embodiment. The only difference between the first and fourth embodiments is the manner in which the stop lamp mounting fastener 22 is coupled to the spoiler. Thus, unless otherwise specified or shown, the first and fourth embodiments are identical in construction. In view of the similarity between the first, second, third and fourth embodiments, the parts of the fourth embodiment that are identical to the parts of the earlier embodiments will be given the same reference numerals as the parts of the earlier embodiments. Moreover, the descriptions of the parts of the fourth embodiment that are identical to the parts of the earlier embodiments may be omitted for the sake of brevity. The parts of the fourth embodiment that differ from the parts of the earlier embodiments will be indicated with a single prime (') or a triple prime ('").

As shown in FIG. 17, the lower wall 28 of the spoiler assembly 12'" is formed with a threaded fastener opening 42'. Further, the upper wall 26 is formed with the threaded aperture 36 as in the first embodiment. Therefore, the lamp securing portion 60 of the stop lamp mounting fastener 22 engages the threaded fastener opening 42' and the threaded aperture 36 for retention of the stop lamp housing 20 within the spoiler assembly 12'". Consequently, both the threaded aperture 36 and the threaded fastener opening 42' retain the stop lamp mounting fastener 22 in the stop lamp securing position. In the stop lamp releasing position either the lower wall 28 of the vehicle spoiler assembly 12'" or the outer body panel 14 retains the stop lamp mounting fastener 22' in an easily re-installable position.

Accordingly with the four above described embodiments, one or both of the body panel 14 and/or the vehicle spoiler 18 can be configured and arranged to maintain a securing orientation of the stop lamp mounting fastener 22 when the stop lamp housing 20 is removed and the vehicle spoiler mounted to the body panel 14.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle spoiler assembly comprising:
    a vehicle spoiler including an upwardly facing spoiler surface, a vehicle body facing spoiler surface and a rear facing spoiler surface with the rear facing spoiler surface having a lamp receiving aperture;
    a stop lamp housing removably disposed in the lamp receiving aperture with a mounting portion of the stop lamp housing disposed between the upwardly facing spoiler surface and the vehicle body facing spoiler surface, the stop lamp housing having a lamp mounted to the stop lamp housing as a removable unit; and a stop lamp mounting fastener including a lamp securing portion and a vehicle body securing portion formed together as a single member configured to move together to reattachably and detachably connect the vehicle spoiler and the stop lamp housing to a vehicle body panel, the lamp securing portion being configured and arranged to selectively engage the mounting portion of the stop lamp housing to removably secure the stop lamp housing to the vehicle spoiler, and the vehicle body securing portion being configured and arranged to removably secure the vehicle spoiler to the vehicle body panel.

2. The vehicle spoiler assembly according to claim 1, wherein
the stop lamp mounting fastener further includes a stop portion disposed between the lamp securing portion and the vehicle body securing portion to limit movement of the stop lamp mounting fastener relative to the vehicle spoiler.

3. The vehicle spoiler assembly according to claim 2, wherein
the lamp securing portion of the stop lamp mounting fastener includes a first set of threads and the vehicle body securing portion of the stop lamp mounting fastener includes a second set of threads.

4. The vehicle spoiler assembly according to claim 3, wherein
the vehicle body securing portion of the stop lamp mounting fastener has a maximum outer diameter equal to an outer pitch diameter of the second set of threads and a free end with a tool engaging recess.

5. The vehicle spoiler assembly according to claim 1, wherein
the vehicle body facing spoiler surface includes a fastener recess with a fastener opening.

6. The vehicle spoiler assembly according to claim 5, wherein
the vehicle body facing spoiler surface includes a body panel contacting portion that surrounds the fastener recess of the vehicle body facing spoiler surface and that is configured to contact a vehicle body.

7. The vehicle spoiler assembly according to claim 1, wherein
the vehicle spoiler includes an upper wall and a lower wall that are spaced apart to form a mounting slot that is sized to be slightly larger than the mounting portion of the stop lamp housing.

8. The vehicle spoiler assembly according to claim 7, wherein
at least one of the upper and lower walls of the vehicle spoiler includes a threaded bore that threadedly receives the lamp securing portion of the stop lamp mounting fastener.

9. The vehicle spoiler assembly according to claim 7, wherein
the lower wall of the vehicle spoiler includes a threaded bore that threadedly receives the lamp securing portion of the stop lamp mounting fastener.

10. The vehicle spoiler assembly according to claim 9, wherein
the lower wall of the vehicle spoiler includes the vehicle body facing spoiler surface with a fastener recess formed in the vehicle body facing spoiler surface.

11. The vehicle spoiler assembly according to claim 1, wherein
the stop lamp mounting fastener is configured for movement between a plurality of orientations, such that in a first orientation the stop lamp mounting fastener secures the stop lamp housing and the vehicle spoiler to the vehicle body panel and in a second orientation releases the stop lamp housing from the vehicle spoiler with the vehicle spoiler in place relative to the vehicle body panel.

12. The vehicle spoiler assembly according to claim 11, wherein
the stop lamp mounting fastener is movable to a third orientation in which the stop lamp mounting fastener releases the vehicle spoiler from the vehicle body panel and secures the stop lamp housing to the vehicle spoiler.

13. The vehicle spoiler assembly according to claim 12, wherein
the stop lamp mounting fastener is movable to a fourth orientation in which the stop lamp mounting fastener releases the vehicle spoiler from the vehicle body panel and releases the stop lamp housing from the vehicle spoiler.

14. The vehicle spoiler assembly according to claim 1, wherein
the vehicle spoiler includes a threaded bore that threadedly receives the lamp securing portion of the stop lamp mounting fastener.

15. A vehicle body structure comprising:
a vehicle body panel with an access opening;
a vehicle spoiler mounted to the vehicle body panel, the vehicle spoiler including an upwardly facing spoiler surface, a vehicle body facing spoiler surface contacting the vehicle body panel and a rear facing spoiler surface with the rear facing spoiler surface having a lamp receiving aperture;
a stop lamp housing removably disposed in the lamp receiving aperture with a mounting portion of the stop lamp housing disposed between the upwardly facing spoiler surface and the vehicle body facing spoiler surface; and
a stop lamp mounting fastener accessible through the access opening in the vehicle body panel, the stop lamp mounting fastener including a lamp securing portion and a vehicle body securing portion that are formed together as a single member and configured to move together to reattachably and detachably connect the vehicle spoiler and the stop lamp housing to the vehicle body panel, the lamp securing portion being configured and arranged to selectively engage the mounting portion of the stop lamp housing when in a stop lamp securing position and to selectively disengage the mounting portion of the stop lamp housing when in a stop lamp releasing position,
at least one of the vehicle body panel and the vehicle spoiler being configured and arranged relative to the stop lamp mounting fastener to maintain a securing orientation of the stop lamp mounting fastener when in the stop lamp securing and releasing positions with the stop lamp housing removed and the vehicle spoiler mounted to the vehicle body panel.

16. The vehicle body structure according to claim 15, wherein
the stop lamp mounting fastener further includes a vehicle body securing portion configured and arranged to selectively engage the vehicle body panel to removably secure the vehicle spoiler to the vehicle body panel.

17. The vehicle body structure according to claim 16, wherein the lamp securing portion of the stop lamp mounting fastener includes a first set of threads and the vehicle body securing portion of the stop lamp mounting fastener includes a second set of threads with a nut selectively threaded onto the second set of threads.

18. The vehicle body structure according to claim 17, wherein
the access opening of the vehicle body panel is slightly larger than an outer pitch diameter of the second set of threads and a free end with a tool engaging recess.

19. The vehicle body structure according to claim 18, wherein
the stop lamp mounting fastener further includes a stop portion disposed between the lamp securing portion and the vehicle body securing portion with the stop portion being configured with a maximum width that is larger than the access opening of the vehicle body panel.

20. The vehicle body structure according to claim 17, wherein
the vehicle body securing portion of the stop lamp mounting fastener has a maximum outer diameter equal to an outer pitch diameter of the second set of threads and a free end with a tool engaging recess.

21. The vehicle body structure according to claim 15, wherein
the vehicle spoiler includes an upper wall and a lower wall that are spaced apart to form a mounting slot that is sized to be slightly larger than the mounting portion of the stop lamp housing.

22. The vehicle body structure according to claim 21, wherein
the lower wall of the vehicle spoiler includes a threaded bore that threadedly receives the lamp securing portion of the stop lamp mounting fastener.

23. The vehicle body structure according to claim 21, wherein
the lower wall of the vehicle spoiler includes a fastener opening that receives the lamp securing portion of the stop lamp mounting fastener, and
the fastener opening of the lower wall is spaced from the access opening of the vehicle body panel by a distance less than an axial length of the stop lamp mounting fastener such that the stop lamp mounting fastener is disposed in both the fastener opening of the lower wall and the access opening of the vehicle body panel when the stop lamp mounting fastener is in the stop lamp releasing position.

24. A vehicle spoiler assembly comprising:
a vehicle body panel having a support surface with an aperture extending therethrough
a vehicle spoiler having a lamp receiving aperture and a mounting surface engaged with the support surface of the vehicle body panel;
a stop lamp housing removably disposed in the lamp receiving aperture and having a lamp mounted to the stop lamp housing as a removable unit; and
a stop lamp mounting fastener movably coupled to the vehicle spoiler by manipulating the stop lamp mounting fastener via the aperture in the support surface of the vehicle body panel to move between a first orientation in which the stop lamp mounting fastener secures the stop lamp housing to the vehicle spoiler and a second orientation in which the stop lamp mounting fastener releases the stop lamp housing from the vehicle spoiler with the vehicle spoiler in place relative to the vehicle body panel.

25. The vehicle spoiler assembly according to claim 24, wherein
the stop lamp mounting fastener is movable to a third orientation in which the stop lamp mounting fastener releases the vehicle spoiler from the vehicle body panel and secures the stop lamp housing to the vehicle spoiler.

26. The vehicle spoiler assembly according to claim 25, wherein
the stop lamp mounting fastener is movable to a fourth orientation in which the stop lamp mounting fastener releases the vehicle spoiler from the vehicle body panel and releases the stop lamp housing from the vehicle spoiler.

* * * * *